(12) United States Patent
DeJong, II et al.

(10) Patent No.: US 10,421,503 B2
(45) Date of Patent: Sep. 24, 2019

(54) WORK VEHICLE

(71) Applicant: KOMATSU LTD., Tokyo (JP)

(72) Inventors: Raymond E. DeJong, II, Chattanooga, TN (US); Thomas G. Bowler, Chattanooga, TN (US); William H. Schierschmidt, Chattanooga, TN (US)

(73) Assignee: Daikin Industries, Ltd., Osaka (JP)

( * ) Notice: Subject to any disclaimer, the term of this patent is extended or adjusted under 35 U.S.C. 154(b) by 195 days.

(21) Appl. No.: 15/617,282

(22) Filed: Jun. 8, 2017

(65) Prior Publication Data
US 2018/0354563 A1 Dec. 13, 2018

(51) Int. Cl.
| | | |
|---|---|---|
| *B62D 33/06* | (2006.01) | |
| *E02F 9/00* | (2006.01) | |
| *E02F 9/08* | (2006.01) | |
| *E02F 9/16* | (2006.01) | |
| *B62D 55/06* | (2006.01) | |

(52) U.S. Cl.
CPC ............ *B62D 33/0617* (2013.01); *E02F 9/00* (2013.01); *E02F 9/0866* (2013.01); *E02F 9/16* (2013.01); *B62D 55/06* (2013.01)

(58) Field of Classification Search
CPC .............. A01G 23/091; B62D 33/0617; B62D 33/0633
USPC ........................................................ 180/9.42
See application file for complete search history.

(56) References Cited

U.S. PATENT DOCUMENTS

| | | | |
|---|---|---|---|
| 4,017,114 A * | 4/1977 | LaBounty | ................. B66C 3/16 |
| | | | 294/197 |
| 4,583,908 A | 4/1986 | Crawford | |
| 5,016,721 A * | 5/1991 | Yamamoto | ............. B60J 5/0487 |
| | | | 180/89.13 |

(Continued)

FOREIGN PATENT DOCUMENTS

EP 3 097 771 A1 11/2016

OTHER PUBLICATIONS

Forest Research: The Research Agency of the Forestry Commission titled CCF Harvesting Method Development: Harvester Head Visibility, No. 1200A/56/07, dated Aug. 2008, Project leader: Duncan Ireland and Gary Kerr.

(Continued)

*Primary Examiner* — Joseph M Rocca
*Assistant Examiner* — Felicia L. Brittman
(74) *Attorney, Agent, or Firm* — Global IP Counselors, LLP

(57) ABSTRACT

A work vehicle includes a ground propulsion apparatus, a chassis, and a vehicle body. The vehicle body includes a first body part with an operator cab and a second body part. The first body part and the second body part are disposed on opposite sides of a fore-aft longitudinal center line of the work vehicle. The second body part has a front exterior surface, an inner side exterior surface, and a vertically extending chamfered exterior surface slanted in an outward-forward direction from the inner side exterior surface towards the front exterior surface to define a vertically extending chamfered corner. The chamfered exterior surface is disposed at least in an area extending from a height position corresponding to a seat index point of the operator cab to a height position corresponding to a design eye point of the operator cab.

19 Claims, 14 Drawing Sheets

(56) References Cited

U.S. PATENT DOCUMENTS

| | | | |
|---|---|---|---|
| 6,155,632 A * | 12/2000 | Fujimoto | B62D 33/0617 |
| | | | 180/89.13 |
| 9,327,582 B2 * | 5/2016 | Matsumiya | B60H 1/32 |
| 9,403,474 B2 | 8/2016 | Kaatrasalo et al. | |
| 2015/0023771 A1 | 1/2015 | Carr et al. | |
| 2015/0337954 A1 | 11/2015 | Storey | |
| 2016/0244111 A1 | 8/2016 | Schierschmidt et al. | |
| 2016/0244947 A1 | 8/2016 | Holcomb et al. | |

OTHER PUBLICATIONS

Tracked Feller Bunchers/Harvesters Brochure 803M/MH/853M/MH/859M/MH: John Deere, Feb. 2017.

\* cited by examiner

WORK VEHICLE

BACKGROUND

Field of the Invention

The present invention generally relates to a work vehicle. More specifically, the present invention relates to a work vehicle configured to improve visibility from an operator cab of the work vehicle.

Background Information

A work vehicle is a machine used in construction, mining, forestry, farming, etc. Such work vehicles typically have at least one work implement coupled to the vehicle body. The work implement is often movable but can be stationary in some cases. Such work vehicles include a ground propulsion apparatus that uses tracks or wheels to propel and/or steer the work vehicle. The tracks or wheels also serve to support the main body of the work vehicle.

The vehicle bodies of some work vehicles have a first body part including an operator cab disposed one side of a longitudinal center line of the work vehicle and a second body part disposed on the other side of the longitudinal center line. For example, such work vehicles as excavators, feller bunchers and harvesters often have a work implement attached to the vehicle body at a position near the longitudinal center line such that the work implement is disposed between the first and second body parts and extends frontward from the work vehicle. The first body part (operator cab) is disposed to one side or the other of the longitudinal center line to avoid interference between the operator cab and the work implement and to allow an operator to have good visibility of the work implement during work. Meanwhile, the second body part provided on the opposite side of the longitudinal center line typically encloses various components of the work vehicle, such as an engine, a hydraulic pump, a fluid tank and a cooling device.

SUMMARY

It has been discovered that in some work vehicles it is necessary to arrange hydraulic pumps and other serviceable components closer to the front of the vehicle body in order to achieve a suitable length dimension of the vehicle body. For example, in some work vehicles, such as feller bunchers, it is desirable to have a vehicle body with a shorter length in the rear in order to achieve a shorter tail swing radius. Since feller bunchers are often used in forests or other wooded areas, it is preferable for the vehicle body to be short in order to avoid interference between the vehicle body and nearby tree trunks and branches that may be located in positions not readily visible to an operator of the work vehicle. In order to achieve the shorter vehicle body length, such components as the engine, pumps, fluid tanks, and cooling devices may be moved forward to a position adjacent the operator cab on the opposite side of longitudinal center line as the operator cab. In some cases, a front panel of the second body part may be disposed slightly more forward than a front panel of the first body part.

Additionally, in order to fit the components within the shorter vehicle body, some of the components may be arranged vertically above and below one another. As a result, the height dimension of a frontward portion of the second body part may need to be increased. Consequently, the visibility from the operator cab of the first body part in a lateral direction toward the second body part (on the opposite side of longitudinal center line as the operator cab) may be limited in comparison with work vehicles in which the serviceable components are arranged further rearward and the frontward portion of the second body part has a shorter height dimension.

Additionally, it has been discovered that it is advantageous for the operator of a feller buncher, for example, to be able to see the front tip ends of the left and right tracks (if the work vehicle is equipped with tracks for ground propulsion). In particular, some operators use a technique in which an inward side of the left or right track is hooked onto the uphill side of the stump of a previously cut tree to provide additional support for the work vehicle while working on a sloped ground surface. Better visibility of the frontward end portions of the tracks, particularly the track on the opposite side of the work vehicle from the operator cab, can help operators execute such techniques and thereby improve productivity.

In view of the state of the known technology and in accordance with a first aspect of the present disclosure, a work vehicle is basically provided that comprises a ground propulsion apparatus, a chassis and a vehicle body. The chassis is supported by the ground propulsion apparatus, and the vehicle body is supported by the chassis. The vehicle body includes a first body part with an operator cab and a second body part. The first body part is disposed on a first lateral side of the chassis, and the second body part is disposed on a second lateral side of the chassis. The first and second lateral sides are opposite lateral sides with respect to a fore-aft longitudinal center line of the work vehicle. The second body part has a front exterior surface, an inner side exterior surface and a vertically extending chamfered exterior surface. The front exterior facing surface faces in a forward direction of the work vehicle. The inner side exterior surface faces in a laterally inward direction of the work vehicle. The vertically extending chamfered exterior surface is slanted in an outward-forward direction from the inner side exterior surface towards the front exterior surface to define a vertically extending chamfered corner. The chamfered exterior surface is disposed at least in an area extending from a height position corresponding to a seat index point of the operator cab to a height position corresponding to a design eye point of the operator cab.

In accordance with a second aspect of the present disclosure, a work vehicle is basically provided that comprises a ground propulsion apparatus, a chassis and a vehicle body. The chassis is supported by the ground propulsion apparatus, and the vehicle body is supported by the chassis. The vehicle body includes a deck, a first body part with an operator cab and a second body part. The first body part is disposed on a first lateral side of the deck, and the second body part is disposed on a second lateral side of the deck. The first and second lateral sides are opposite lateral sides with respect to a fore-aft longitudinal center line of the work vehicle. The deck has a front end edge extending in a widthwise direction of the chassis. The front end edge includes a first end edge portion disposed on the first lateral side and a second end edge portion disposed on the second lateral side. The first end edge portion is offset in a rearward direction of the chassis from the second end edge portion. The first body part has a first lower frontward edge, and the second body part has a second lower frontward edge. The first lower frontward edge is disposed rearward of the second lower frontward edge.

Also other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure.

DETAILED DESCRIPTION OF EMBODIMENT

Figure 1:
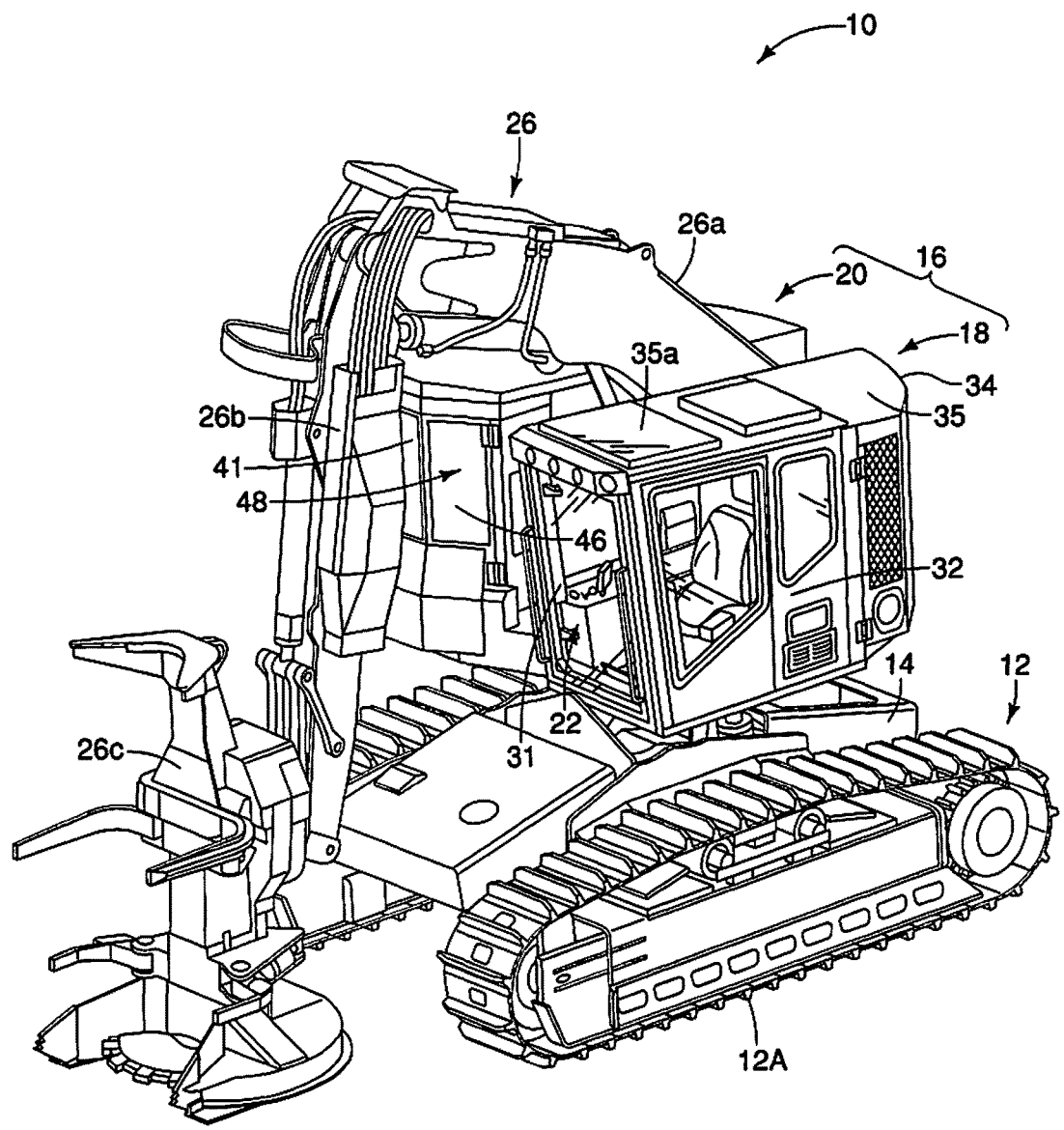
FIG. 1 is a front perspective view of a work vehicle in accordance with one illustrative embodiment.

A selected embodiment will now be explained with reference to the drawings. It will be apparent to those skilled in the art from this disclosure that the following description of the embodiment is provided for illustration only and not for the purpose of limiting the invention as defined by the appended claims and their equivalents.

Referring initially to FIGS. 1 to 5, a work vehicle 10 is illustrated in accordance with one illustrated embodiment. As explained below, the work vehicle 10 is configured to improve the lateral visibility for an operator seated in the work vehicle 10. In the illustrated embodiment, the work vehicle 10 is a short tail tracked feller buncher. While certain aspects are particularly beneficial in a feller buncher, many of the aspects of the work vehicle 10 can be applied to other types of work vehicle.

The work vehicle 10 basically includes a ground propulsion apparatus 12, a chassis 14 and a vehicle body 16. The ground propulsion apparatus 12 serves to move the work vehicle 10 along a ground surface. The chassis 14 is a frame structure that is disposed between the ground propulsion apparatus 12 and the vehicle body 16. The chassis 14 supports the vehicle body 16 with respect to the ground propulsion apparatus 12. Here, the vehicle body 16 is swingably mounted to the chassis 14 about a vertical swing axis A.

Basically, the vehicle body 16 includes a first body part 18 and a second body part 20. The first body part 18 has an operator cab 22. The vehicle body 16 further includes a deck 24 as a platform on which the first body part 18 and the second body part 20 are supported. The deck 24 has a front end edge 24a, a rear end edge 24b and a first side edge 24c and a second side edge 24d. The front end edge 24a of the deck 24 extends in a widthwise direction of the chassis 14 between the first and second side edges 24c and 24d. The deck 24 will be explained in more detail later.

Figure 4:
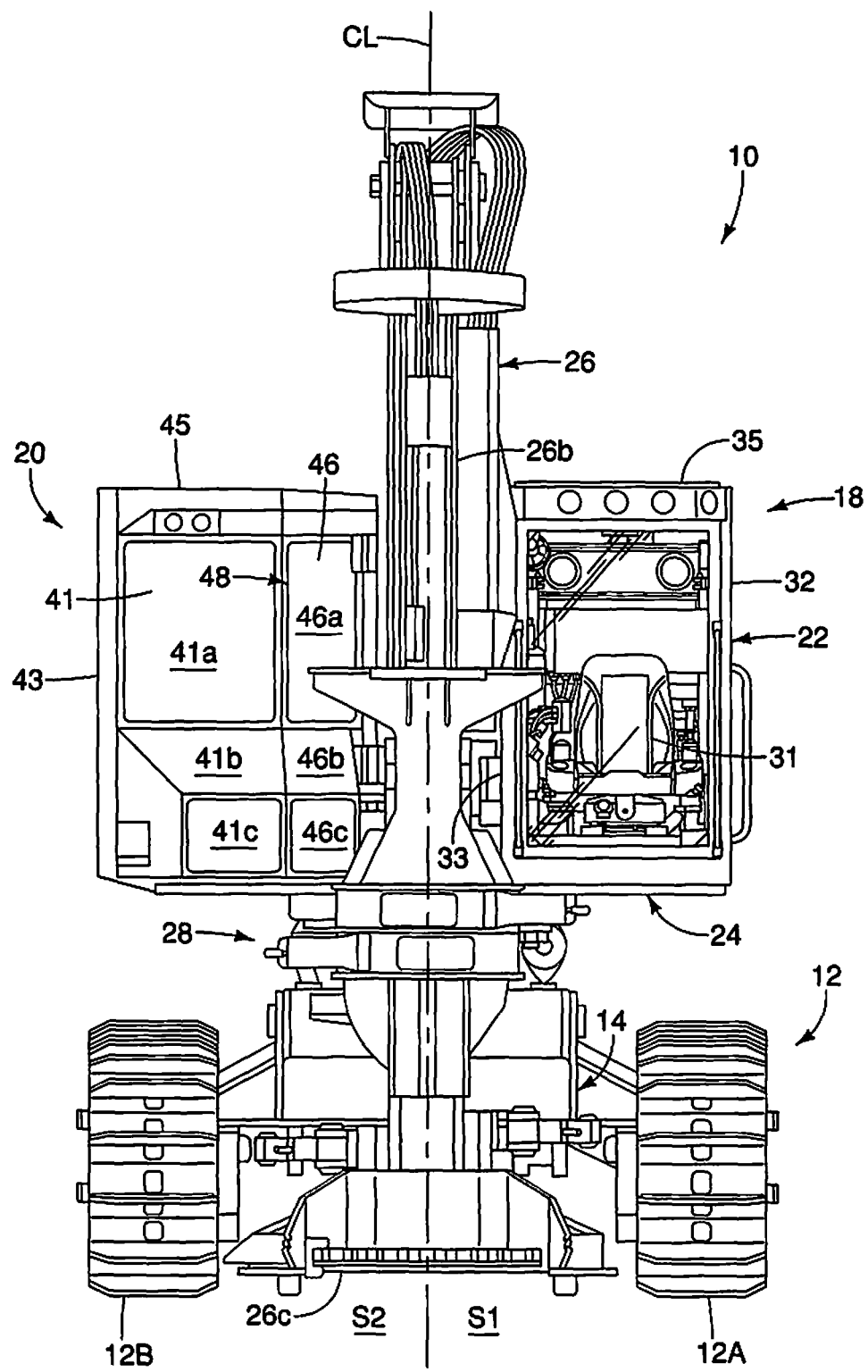
FIG. 4 is a front elevational view of the work vehicle illustrated in FIG. 1.

As seen in FIG. 4, the first body part 18 is disposed on a first lateral side S1 (left lateral side) of the chassis 14, and the second body part 20 is disposed on a second lateral side S2 (right lateral side) of the chassis 14. The first and second lateral sides SI and S2 are opposite lateral sides with respect to a fore-aft longitudinal center line CL of the work vehicle 10. In the illustrated embodiment, the operator cab 22 is located on the first lateral side S1 of the chassis 14.

Figure 7:
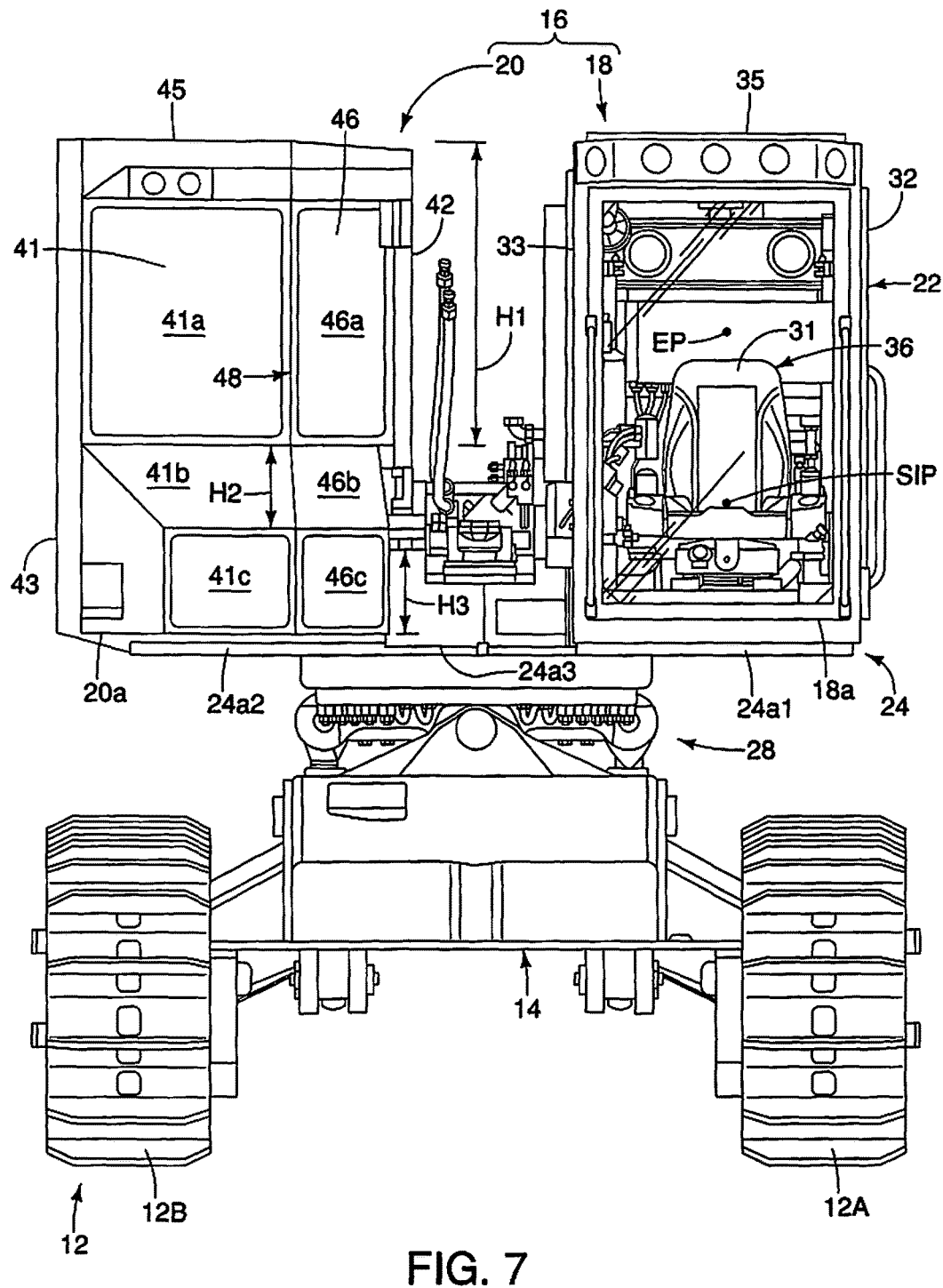
FIG. 7 is a front elevational view of the work vehicle illustrated in FIG. 1 with the work implement removed.
Figure 8:
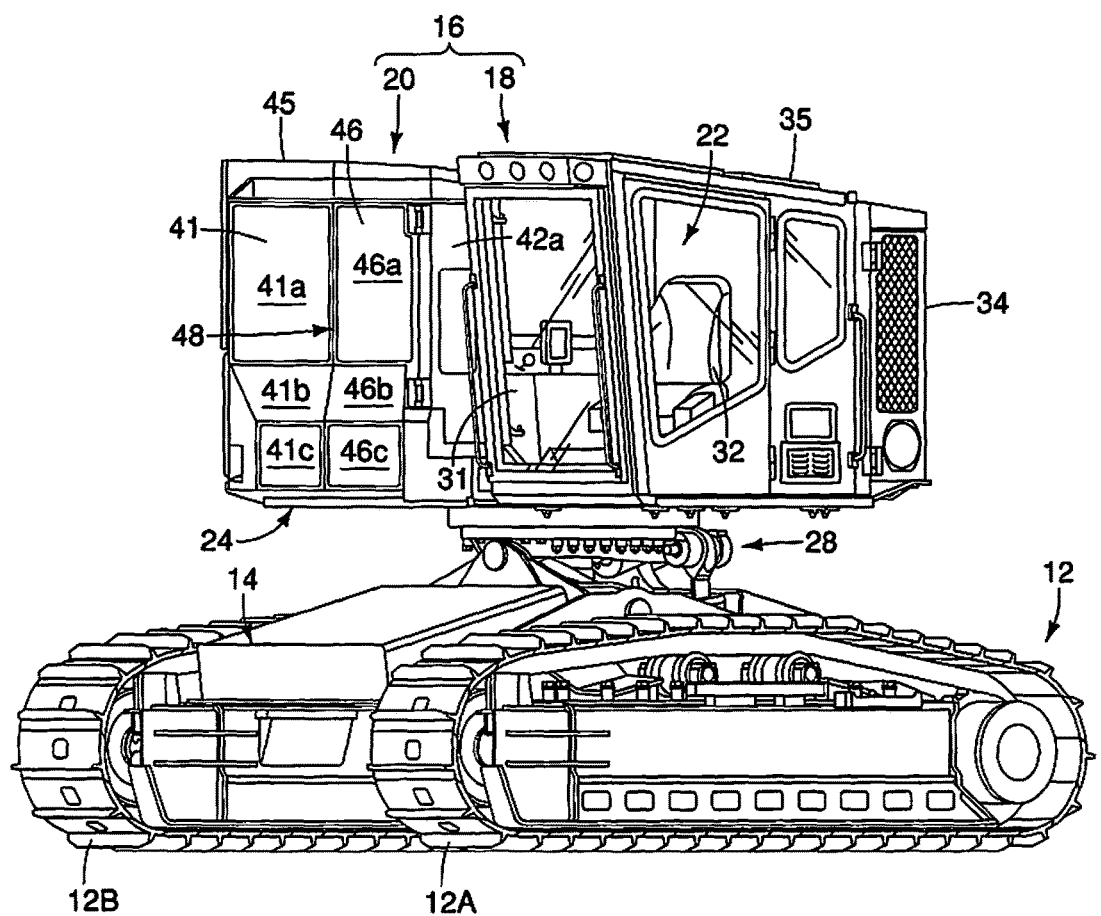
FIG. 8 is a front oblique view of the work vehicle illustrated in FIG. 1 with the work implement removed, and viewed along a direction perpendicular to the chamfered exterior surface.
Figure 9:
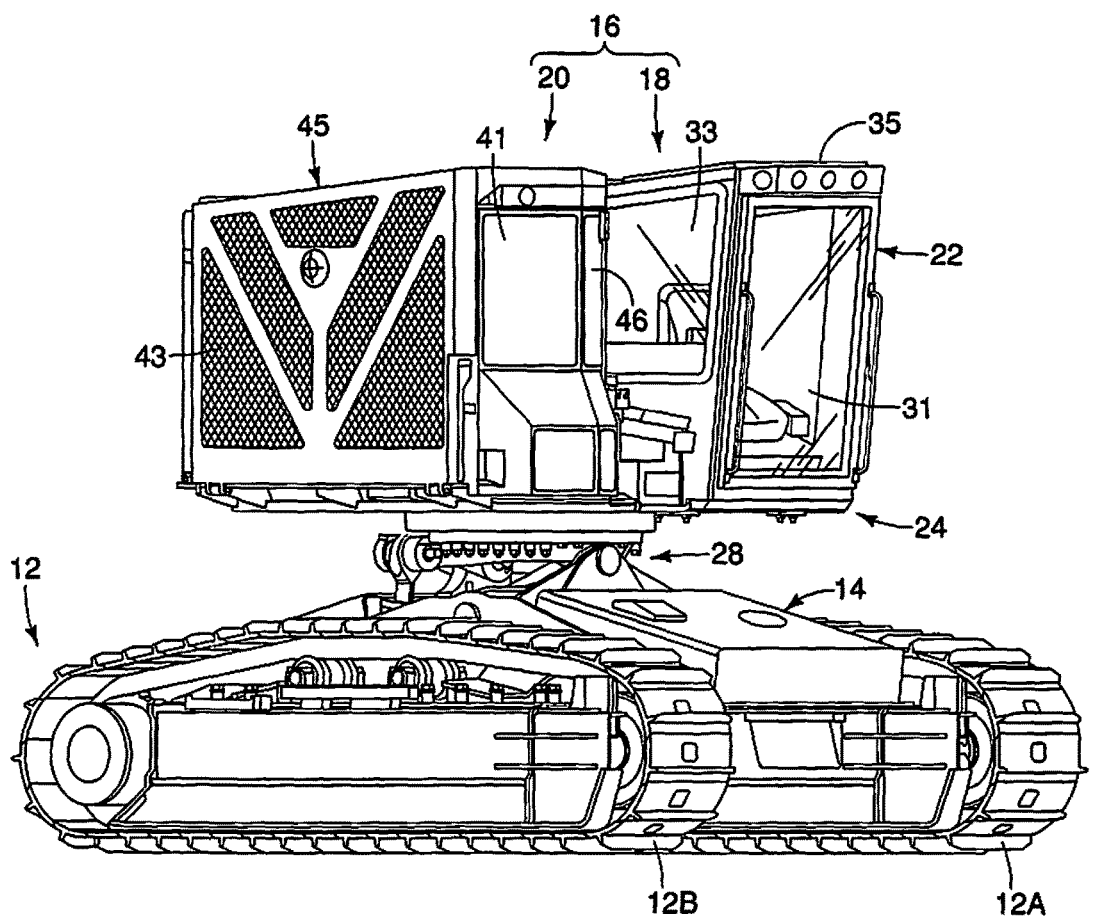
FIG. 9 is a front oblique view of the work vehicle illustrated in FIG. 1 with the work implement removed, viewed along a direction parallel to the chamfered exterior surface.
Figure 10:
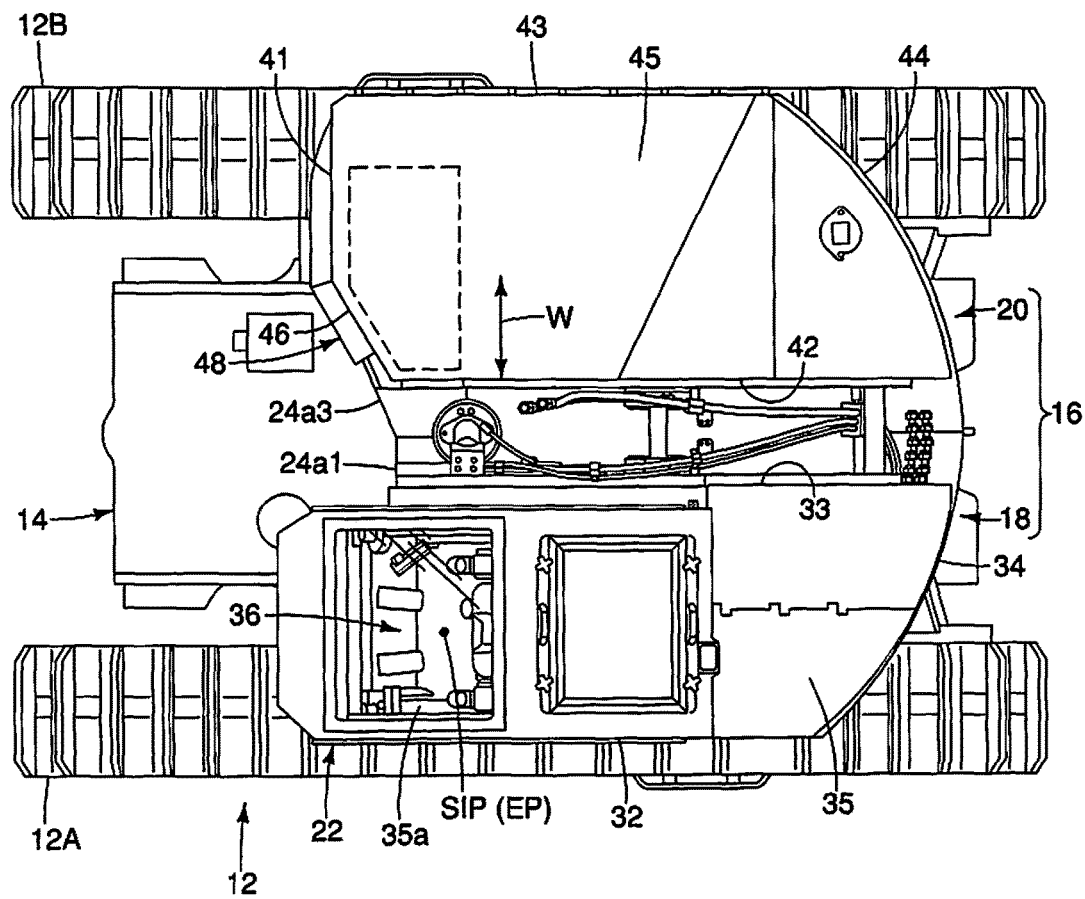
FIG. 10 is top plan view of the work vehicle illustrated in FIG. 1 with the work implement removed.
Figure 11:
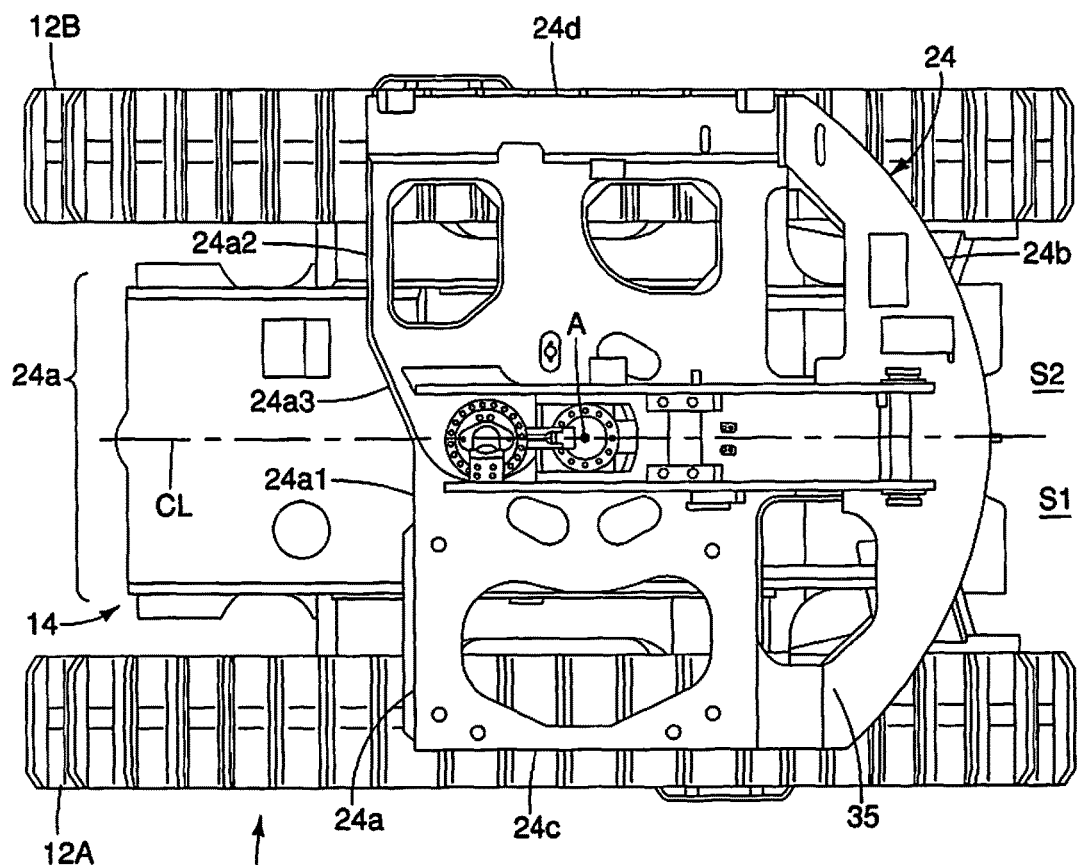
FIG. 11 is a top plan view of the work vehicle illustrated in FIG. 1 with the work implement removed and with most of the vehicle body removed such that the deck is exposed.

As shown in FIGS. 1-5, the vehicle body 16 further includes a work implement 26. In the illustrated embodiment, the work implement 26 is attached to the vehicle body 16 at a point rearward of the operator cab 22. More specifically, the work implement 26 is attached to the deck 24 at a point rearward of the operator cab 22. The work implement 26 is disposed between the first body part 18 and the second body part 20. The work implement 26 is disposed along the fore-aft longitudinal center line CL of the work vehicle 10. In the illustrated embodiment, as shown in FIGS. 7, 10, and 11, the work implement 26 is attached to the deck 24 at a position close to a rear end of the deck 24 and above a rear end portion of the chassis 14. This arrangement of the work implement 26 allows the weight of the work implement 26 to act as a counterweight of the work vehicle 10 and contributes to a shorter tail swing radius.

Although the work vehicle 10 of the illustrated embodiment includes the work implement 26, certain aspects of the work vehicle 10 as discussed and illustrated herein can be implemented in work vehicles that do not include a work implement. In illustrated embodiment, the work implement 26 includes a boom 26a, an arm 26b and a work attachment 26c. The boom 26a has a first end pivotally attached to the deck 24 and a second end pivotally attached to a first end of the arm 26b. The work attachment 26c is movably attached to a second end of the arm 26b. Here, the work attachment 26c is a high-speed disc saw. The boom 26a and the arm 26b are operated using a hydraulic system in a conventional manner. Thus, the operation of the hydraulic system for the boom 26a and the arm 26b will not be discussed and/or illustrated in further detail herein. Also, the work attachment 26c is also operated in a conventional manner. Thus, the operation of the work attachment 26c will not be discussed and/or illustrated in further detail herein.

The ground propulsion apparatus 12 of the illustrated embodiment includes an undercarriage and other conventional parts that enable the work vehicle 10 to move along a ground surface. In the illustrated embodiment, the ground propulsion apparatus 12 includes a left or first track 12A and a right or second track 12B. The first and second tracks 12A and 12B are arranged to contact the ground surface. The first and second first and second tracks 12A and 12B are driven by, for example, a hydraulic motor (not shown). In the illustrated embodiment, the work vehicle 10 is a short tail tracked feller buncher in that the rear end of the vehicle body 16 does not extend beyond the first and second tracks 12A and 12B. In other words, a rearmost portion of the vehicle body 16 is positioned forward with respect to a rearmost end of the first and second tracks 12A and 12B when the vehicle body 16 is oriented facing forward without a swing angle.

Although the ground propulsion apparatus 12 of the illustrated embodiment has the first and second first and second tracks 12A and 12B, the invention is not limited to a work vehicle that uses tracks. For example, the ground propulsion apparatus 12 can include wheels or some other means of moving the work vehicle 10 along the ground.

Figure 2:
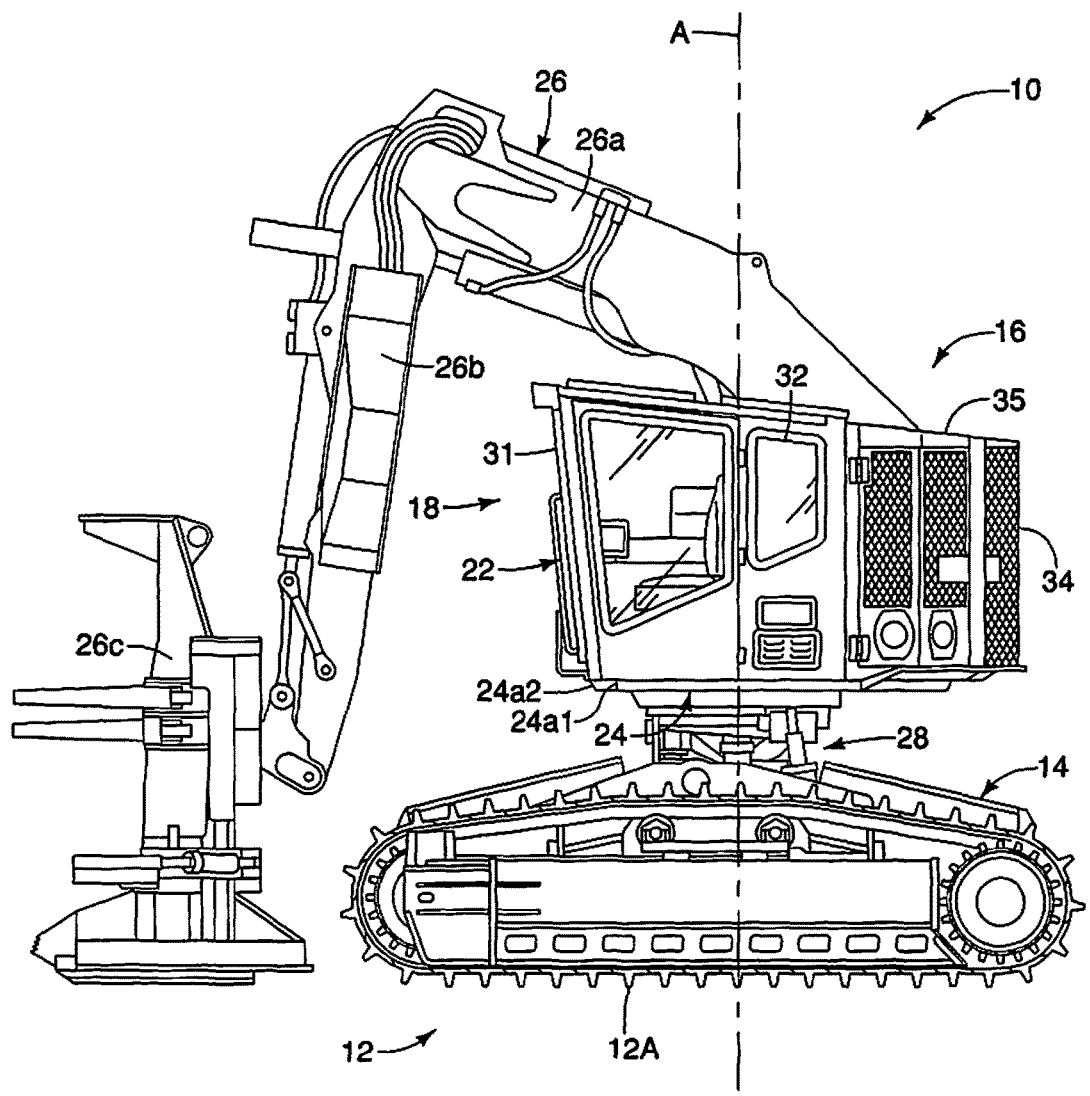
FIG. 2 is a left side elevational view of the work vehicle illustrated in FIG. 1.
Figure 3:
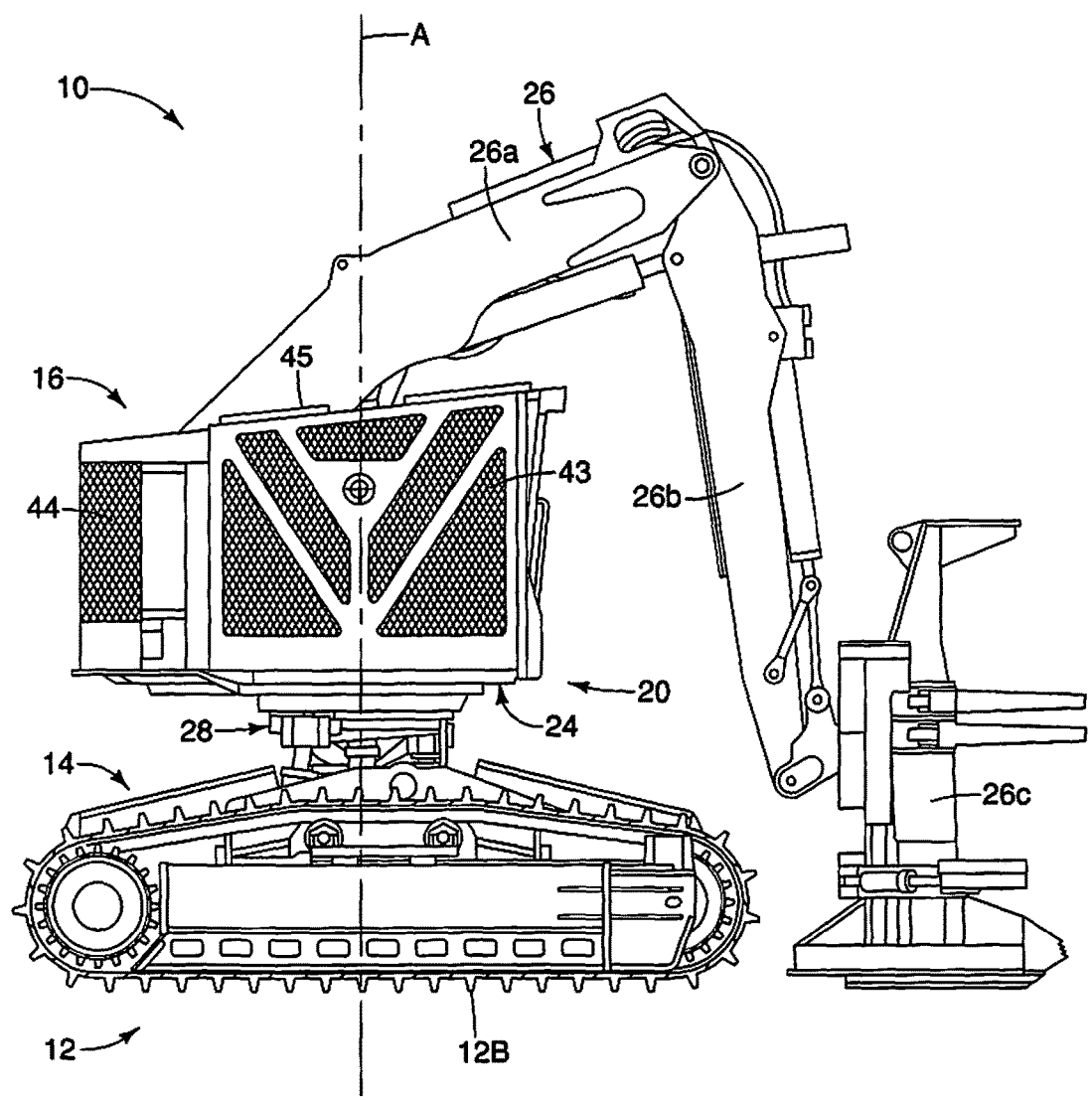
FIG. 3 is a right side elevational view of the work vehicle illustrated in FIG. 1.
Figure 6:
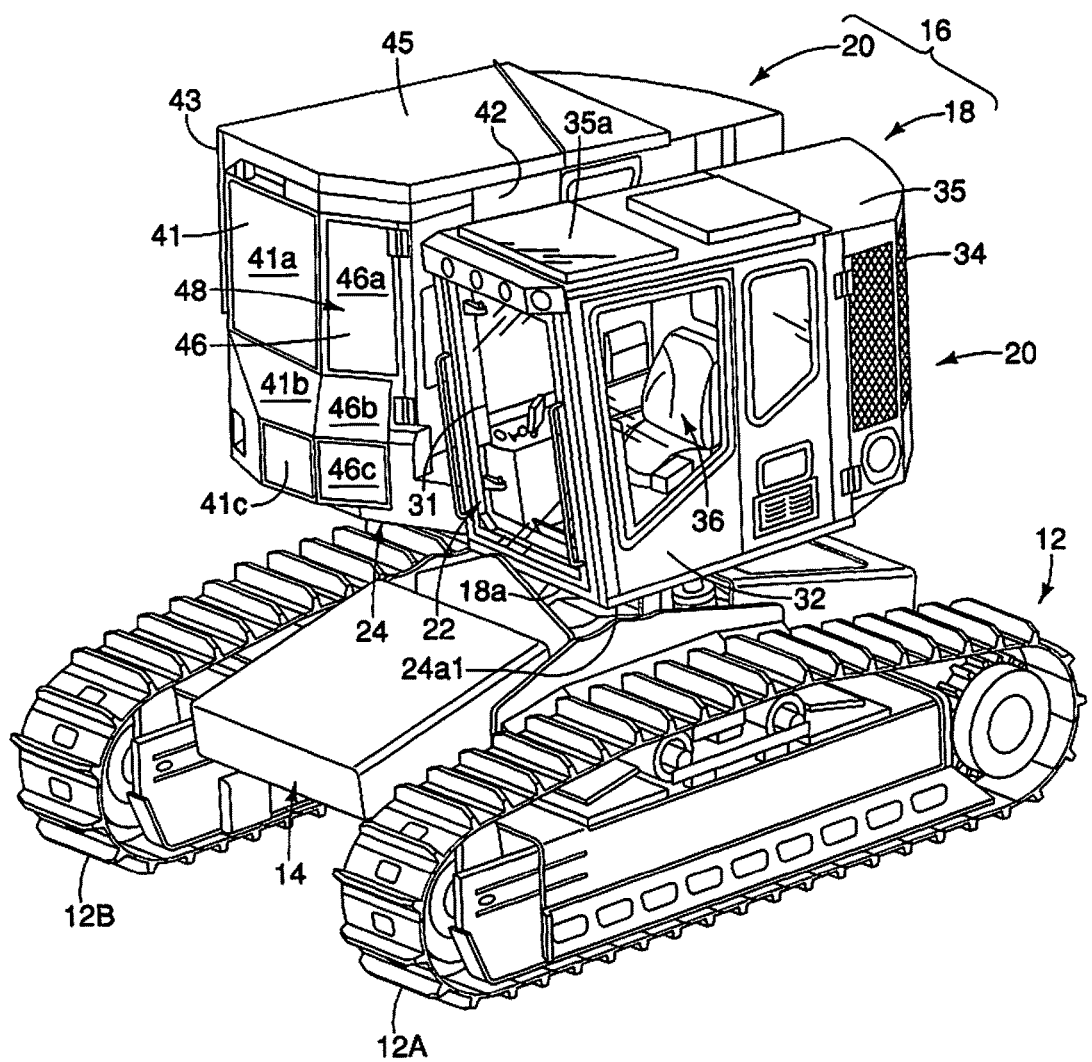
FIG. 6 is a front perspective view of the work vehicle illustrated in FIG. 1 with the work implement removed.

As best shown in FIGS. 6 and 7, the chassis 14 is basically a frame to which the ground propulsion apparatus 12 is attached. The chassis 14 is supported with respect to the ground surface by the ground propulsion apparatus 12 and serves to support the vehicle body 16 with respect to the ground propulsion apparatus 12. In the illustrated embodiment, the chassis 14 is a generally rectangular frame structure having left and right lateral sides configured to support the first and second tracks 12A and 12B. An upper surface of the chassis 14 is configured to bulge upward at a middle portion between a front end and a rear end of the chassis 14. The middle portion is configured to support a swing apparatus 28 that supports the vehicle body 16. The swing apparatus 28 includes a swing bearing and a swing motor. In the illustrated embodiment, the swing motor, the swing bearing, and the vehicle body 16 are coupled together such that the vehicle body 16 can be rotated about a vertical swing axis A by the swing motor. Thus, as shown in FIGS. 2 and 3, the vehicle body 16 is supported on the swing apparatus 28 such that the vehicle body 16 is swingably mounted to the chassis 14 about the vertical swing axis A. Although the illustrated embodiment is provided with the swing apparatus 28, the invention is not limited to a work vehicle that includes a swing apparatus. The vehicle body 16 could be non-rotatable or fixed with respect to the chassis 14.

In the illustrated embodiment, the first body part 18 is arranged on the left side of the fore-aft longitudinal center line CL of the work vehicle 10 such that the first body part 18 is disposed above the first track 12A. The first body part 18 has a generally box-like shape including a front panel 31, a left side panel 32, a right side panel 33, a rear panel 34 and a roof panel 35. The panels 31 to 35 define exterior surfaces of the first body part 18. The panels 31, 32 and 33 define an exterior of the operator cab 22. In the illustrated embodiment, each of the panels 31, 32 and 33 is provided with one or more windows to allow an operator to see in frontward, leftward, and rightward directions from inside the operator cab 22. In the illustrated embodiment, the roof panel 35 is provided with a skylight 35a to allow natural light to enter the operator cab 22. The front panel 31 is mainly provided with a window that is tilted slightly forward such that an upper end of the first front panel 31 is disposed farther forward than a lower end of the first front panel 31. The operator cab 22 is not limited to the particular arrangement of windows shown in drawings. Any arrangement of windows is acceptable so long as the windows provide sufficient visibility from the operator cab 22. In particular, the window(s) of the right side panel 33 preferably allows the operator to see at least a frontward portion of the second body part 20 when the operator is seated inside the operator cab 22 and looking from a position corresponding to a design eye point EP (explained later).

The operator cab 22 will now be briefly described referring particularly to FIGS. 4 to 7. The operator cab 22 includes a driver's seat 36 and various operating members used by the operator to operate the work vehicle 10. In the illustrated embodiment, two joystick type operating members are provided on opposite sides of the driver's seat 36 to be operated by hand, and two pedal type operating members are provided on the floor to be operated with the operator's feet. There are no particular limitations on the arrangement and type of operating members provided in the operator cab 22. However, the operating members will typically be arranged in positions where they are easy for the operator to access and do not obstruct the operator's field of view.

Referring now to FIGS. 3 to 10, the second body part 20 will be explained. In the illustrated embodiment, the second body part 20 is arranged on the right side of the fore-aft longitudinal center line CL of the work vehicle 10 such that the second body part 20 is disposed above the second track 12B. Although the first body part 18 is provided on the left side of the fore-aft longitudinal center line CL and the second body part 20 is provided on the right side of the fore-aft longitudinal center line CL in the illustrated embodiment, the work vehicle 10 is not limited to such an arrangement. Thus, it is acceptable for the first body part 18 to be arranged on the right side of the fore-aft longitudinal center line CL, and the second body part 20 to be arranged on the left side of the fore-aft longitudinal center line CL.

The second body part 20 will now be explained with reference to FIGS. 3 to 10. In the illustrated embodiment, the second body part 20 has a generally box-like shape and includes a front panel 41, a left side panel 42, a right side panel 43, a rear panel 44, a top panel 45 and a chamfered corner panel 46. The chamfered corner panel 46 is disposed between the front panel 41 and the left side panel 44. The panels 41 to 46 define exterior surfaces of the second body part 20.

In particular, the front panel 41 defines a first front exterior surface 41a, a second front exterior surface 41b and a third front exterior surface 41c. The first, second and third front exterior surfaces 41a, 41b and 41c face in a forward direction of the work vehicle 10. The left side panel 42 defines an inner side exterior surface 42a that faces in a laterally inward direction of the work vehicle 10. The chamfered corner panel 46 defines a first chamfered exterior surface 46a, a second chamfered exterior surface 46b and a third chamfered exterior surface 46c. The first, second and third chamfered exterior surfaces 46a, 46b and 46c are slanted with respect to the fore-aft longitudinal direction of the work vehicle 10. The second chamfered exterior surface 46b is also tilted with respect to a vertical direction of the work vehicle 10. The second chamfered exterior surface 46b extends between the first and third chamfered exterior surfaces 46a and 46c. The first and third chamfered exterior surfaces 46a and 46c are vertically extending chamfered exterior surfaces that are slanted in an outward-forward direction from the inner side exterior surface 42a towards the front exterior surface 41a, thereby defining a vertically extending chamfered corner 48.

As shown in FIGS. 4 to 10, the second and third exterior surfaces 41b and 41c of the front panel 41 define a frontwardly bulged portion that protrudes forwardly with respect to a frontmost edge of the top panel 45 of the second body part 20. Similarly, the second and third chamfered exterior surfaces 46b and 46c of the chamfered corner panel 46 define a frontwardly bulged portion that protrudes forwardly with respect to a frontmost edge of the top panel 45 of the second body part 20. In the illustrated embodiment, the frontwardly bulged portions of the front panel 41 and the chamfered corner panel 46 are provided at lower portions of the front panel 41 and the chamfered corner panel 46. The forwardly bulged portions provide additional space inside the serviceable component compartment of the second body part 20. In the illustrated embodiment, the additional space is particularly used to house a hydraulic pump (not shown). The forwardly bulged portion of the chamfered corner panel 46 is at least partially disposed below the seat index point SIP of the operator cab 22. As shown in FIG. 7, an upper part of each of the frontwardly bulged portions is disposed at approximately the same height as the seat index point SIP. However, in the illustrated embodiment, a majority of each of the forwardly bulged portions is disposed lower than the seat index point SIP.

Although in the illustrated embodiment the chamfered exterior surfaces 46b and 46c are chamfered in the diagonal direction along the entire height of the forwardly bulged portion of the second body part 20, it is also acceptable for the chamfered corner panel 46 to be configured such that the chamfered exterior surface extends only at least partially along the forwardly bulged portion. Additionally, although forwardly bulged portions are provided on the second body part 20 in the illustrated embodiment, the second body part 20 is not limited to an arrangement having forwardly bulged portions. For example, it is acceptable for the front panel 41 to be substantially flat over the entire front exterior surface. Also, in the case of a flat front exterior surface, it is acceptable for the chamfered exterior surface 46a to extend downward to the bottom of the second body part 20 or to any position between a height position corresponding to the seat index point SIP and the bottom of the second body part 20.

In the illustrated embodiment, each of the first and third chamfered exterior surfaces 46a and 46c of the chamfered corner panel 46 has a planar shape that extends in the vertical direction of the work vehicle 10 and a diagonal direction with respect to the fore-aft longitudinal direction of the work vehicle 10. The second chamfered exterior surface 46b has a planar shape that extends tilted with respect to the vertical direction of the work vehicle 10 and extends in a diagonal direction with respect to the fore-aft longitudinal direction of the work vehicle 10. In this way, the chamfered exterior surfaces 46a, 46b and 46c defined by the chamfered corner panel 46 extend downwardly from the top of the second body part 20 to the bottom of the second body part 20. By providing the chamfered corner panel 46, the operator's visibility towards the right side of the work vehicle is increased. It will be apparent from this disclosure that the precise size, location and shape of the chamfered corner panel 46 depends on various factors of the work vehicle 10. In other words, the precise size, location and shape of the chamfered corner panel 46 that is shown in the drawings can be varied to obtain the desired visibility. For example, if the work vehicle 10 were reconfigured with an operator cab on the right side, then the chamfered corner panel would be on the left side.

As shown in FIG. 7, the first chamfered exterior surface 46a of the chamfered corner panel 46 has a vertical height H1, the second chamfered exterior surface 46b has a vertical height H2 and the third chamfered exterior surface 46c has a vertical height H3. Thus, the first and second chamfered exterior surfaces 46a and 46b of the chamfered corner panel 46 are disposed at least in an area extending from a height position corresponding to a seat index point SIP of the operator cab 22 to a height position corresponding to the design eye point EP of the operator cab 22. In the illustrated embodiment, as seen in FIG. 10, the first, second and third chamfered exterior surfaces 46a, 46b and 46c of the chamfered corner panel 46 are configured to have a lateral width W that extends at least one-fourth of an overall widthwise dimension of the second body part 20.

Figure 5:
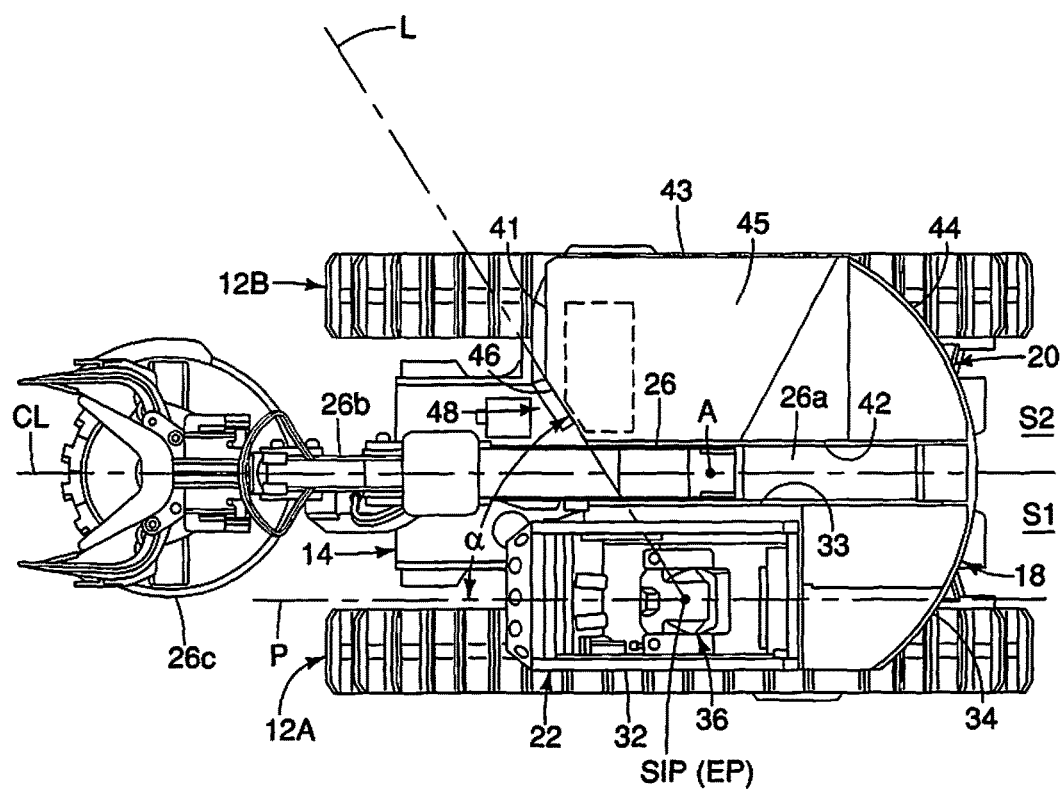
FIG. 5 is a top plan view of the work vehicle illustrated in FIG. 1 with the roof of the operator cab removed.

The first, second and third chamfered exterior surfaces 46a, 46b and 46c of the chamfered corner panel 46 are disposed with respect to the seat index point SIP of the operator cab 22 to provide at least fifty-five degrees of lateral visibility from a forward sight plane P that passes through the seat index point SIP. The forward sight plane P is a vertical plane that passes through the seat index point SIP and extends in the fore-aft longitudinal direction of the vehicle body 16. Thus, as shown in FIG. 5, the first chamfered exterior surface 46a is arranged with respect to the seat index point SIP to provide a lateral viewing angle a of at least fifty-five degrees, and more preferably at least fifty-seven degrees. The third chamfered exterior surface 46c is arranged with respect to the seat index point SIP to provide a lateral viewing angle of at least fifty-five degrees. Thus, the first, second and third chamfered exterior surfaces 46a, 46b and 46c are arranged with respect to the seat index point SIP to provide a lateral viewing angle of at least fifty-five degrees along the entire vertical height of the second body part 20. As used herein, the lateral viewing angle a with respect to the chamfered exterior surface 46a is an angle between a line corresponding to the forward sight plane P and a line L extending diagonally forward and rightward from the seat index point SIP so as to lie on the chamfered exterior surface 46a in a top plan view. Additionally, in the illustrated embodiment, the line L lying in the plane of the chamfered exterior surface 46a passes through the seat index point SIP and the design eye point EP in a top plan view. Thus, in the illustrated embodiment, the lateral viewing angle a is approximately 60 degrees with respect to a fore-aft longitudinal direction of the vehicle body 16, and the chamfered exterior surface 46a is disposed at an angle of approximately 30 degrees with respect to a widthwise transverse direction of the vehicle body 16.

As shown in FIGS. 7 and 10, the first and second tracks 12A and 12B protrude forward beyond the vehicle body 16. A frontward end of the second track 12B is visible to an operator setting in the driver's seat 36 of the operator cab 22. Due to the shape of the chamfered exterior surface 46a formed by the chamfered surface panel, a larger portion of the front end of the second track 12B is visible from the operator cab 22 that would be visible if the second body part 20 had a box-like shape without the chamfered exterior surface 46a. In the illustrated embodiment, the chamfered exterior surface 46a is disposed with respect to the seat index point SIP of the operator cab 22 and the second track to provide a view of a front end of the second track 12B (second track) in a longitudinal direction of the work vehicle 10 from the design eye point EP. That is, a front portion of the second track 12B is visible from the design eye point EP of the work vehicle 10. More specifically, by providing the chamfered exterior surface 46a approximately one-fourth to one-third of the entire length of the second track 12B is visible from the design eye point EP of the work vehicle 10. Preferably, a majority of the front portion of the second track 12B that is positioned forward of the second body part 20 is visible from the design eye point EP of the work vehicle 10. More preferably, at least eighty percent of the front portion of the second track 12B that is positioned forward of the second body part 20 is visible from the design eye point EP of the work vehicle 10. Even more preferably, at least ninety percent of the front portion of the second track 12B that is positioned forward of the second body part 20 is visible from the design eye point EP of the work vehicle 10 as shown in FIG. 5.

The second body part 20 basically forms a compartment for housing various serviceable components of the work vehicle 10. For example, an engine, a hydraulic pump, a fluid tank, and a cooling device may be housed inside the second body part 20. In the illustrated embodiment, a cooling device (not shown) is arranged in a rear portion of the second body part 20, and at least one hydraulic pump (not shown) is arranged in a lower front portion of the interior of the second body part 20.

Figure 12:
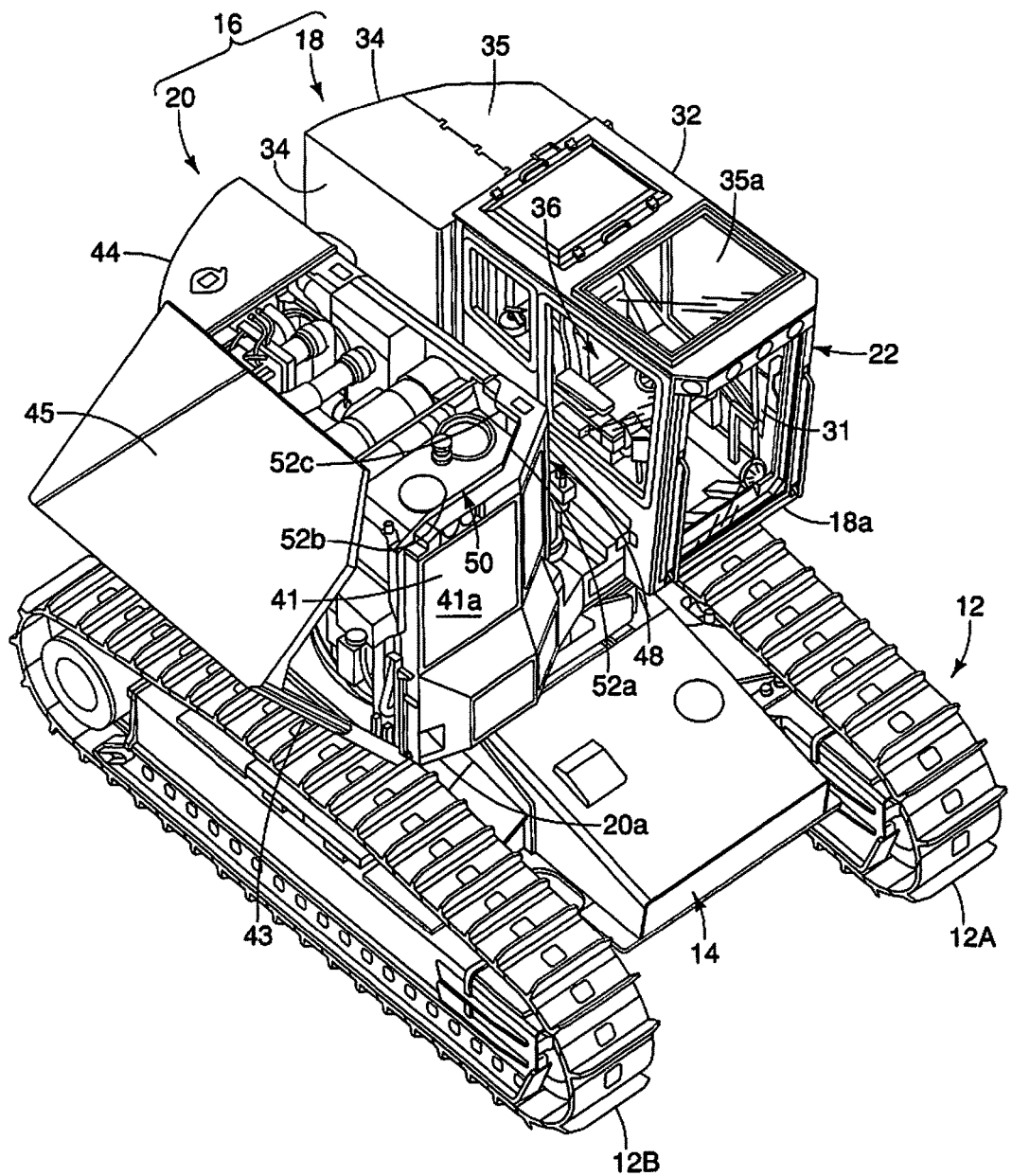
FIG. 12 is a front perspective view of the work vehicle illustrated in FIG. 1 with the work implement removed and the cover of the serviceable component compartment opened.
Figure 13:
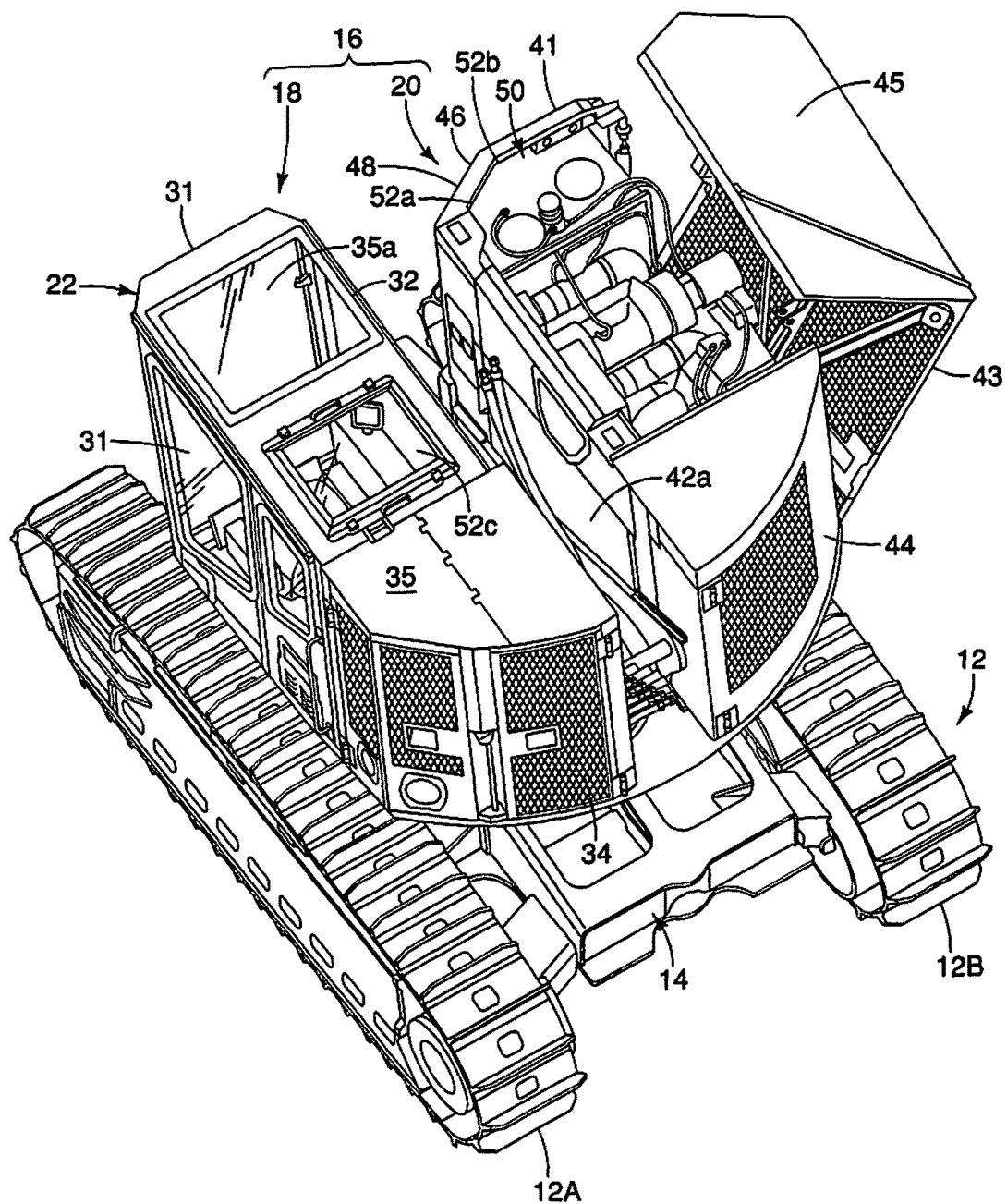
FIG. 13 is a top rear end perspective view of the work vehicle illustrated in FIG. 1 with the work implement removed and the cover of the serviceable component compartment partially opened.
Figure 14:
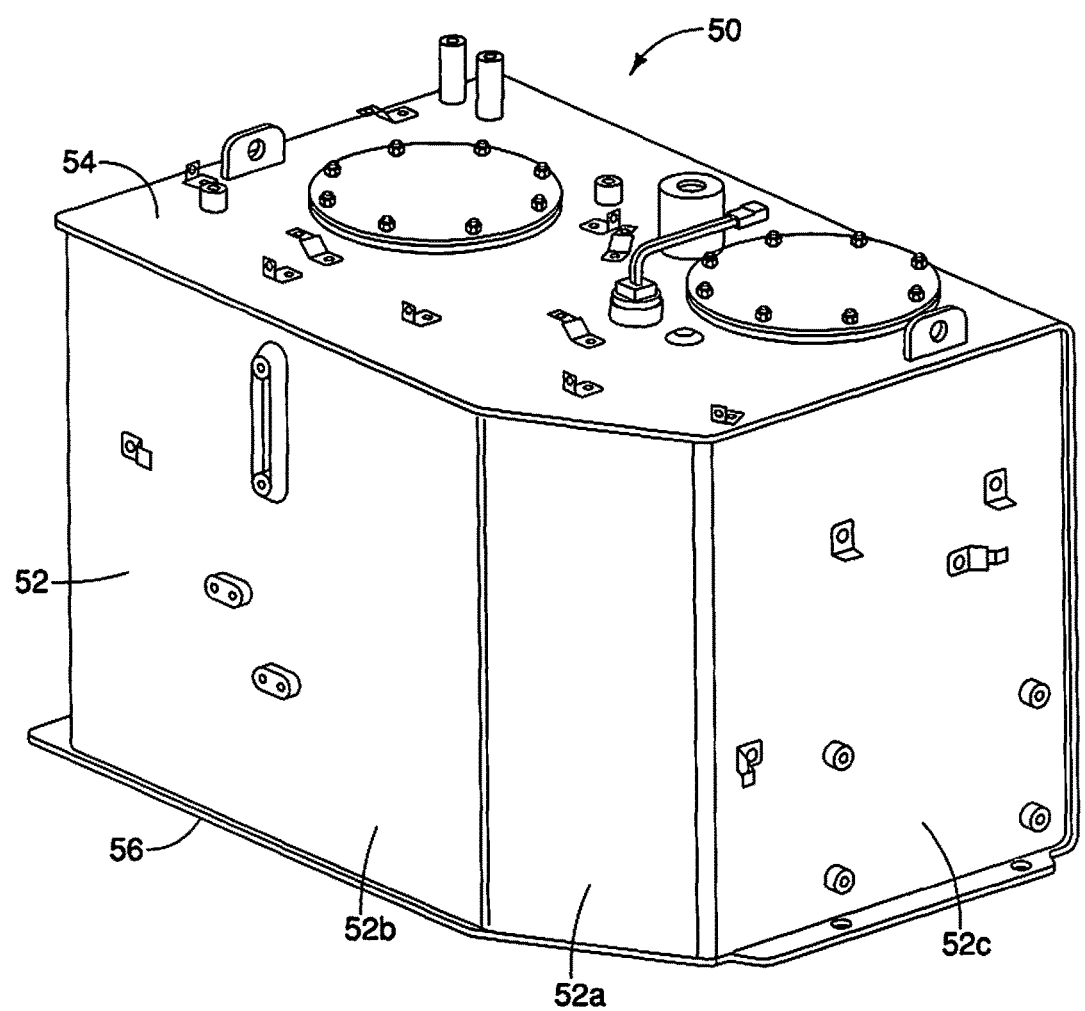
FIG. 14 is a front perspective view of a fluid tank of the work vehicle illustrated in FIG. 1 having a vertically extending chamfered corner.

As shown in FIGS. 12 and 13, a fluid tank 50 is housed in a front upper portion of the second body part 20. The fluid tank 50 may contain oil for a hydraulic system of the work vehicle 10 or some other fluid. In the illustrated embodiment, the fluid tank 50 holds hydraulic oil. The fluid tank 50 has a sidewall 52, a top wall 54 and a bottom wall 56. The sidewall 52 of the fluid tank 50 has a vertically extending chamfered corner 52a. The chamfered corner 52a extends between a front panel 52b and an inner side panel 52c. In this way, the chamfered corner 52a is nested inside the chamfered corner 48 of the second body part 20. That is, the shape of the fluid tank 50 is specifically tailored to take advantage of the shape of the space inside the second body part 20. Although the illustrated embodiment shows the fluid tank 50 arranged in a front upper portion of the second body part 20, it is acceptable for the fluid tank 50 to be arranged in a lower portion or a middle portion of the second body part 20 with a chamfered corner configured to be nested inside the chamfered corner 48 of the second body part 20. It is also acceptable to have more than one fluid tank arranged inside the second body part 20 with each of the fluid tanks having a vertically extending chamfered corner nested inside the chamfered corner 48 of the second body part 20.

As seen in FIG. 11, the deck 24 of the vehicle body 16 will now be explained in more detail. As previously mentioned, the deck 24 is a platform that supports the first body part 18 and the second body part 20. The deck 24 is basically a relatively flat platform. The front end edge 24a includes a first or left end edge portion 24a1, which is disposed on the left lateral side, and a second or right end edge portion 24a2, which is disposed on the right lateral side. The front end edge 24a of the deck 24 includes a transitional portion 24a3 that extends diagonally between the first and second end edge portions 24a1 and 24a2. The transitional portion 24a3 substantially corresponds to a shape of the chamfered corner 28 as viewed in a top plan view of the deck 24. The first end edge portion 24a1 is configured and arranged to correspond to the first body part 18, and the second end edge portion 24a2 is configured and arranged to correspond to the second body part 20. In the illustrated embodiment, the first end edge portion 24a1 is offset in a rearward direction of the chassis 14 from the second end edge portion 24a2. Additionally, a first lower frontward edge 18a of the first body part 18 is spaced forward of the first end edge portion 24a1 of the deck 24. Consequently, the first body part 18 partially overhangs forwardly beyond the first end edge portion 24a1 of the deck 24. A second lower front edge portion 20a of the second body part 20 is aligned with the second end edge portion 24a2 of the deck 24. Also, the first lower frontward edge 18a of the first body part 18 is disposed rearward of the second lower frontward edge 20a of the second body part 20. In other words, a bottom end of the front panel 31 of the first body part 18 is disposed farther rearward than a bottom edge of the front panel 41 of the second body part 20.

The seat index point SIP and the design eye point EP will now be explained. The seat index point SIP used in this disclosure is defined by the international standards ISO 5353 (second edition dated Dec. 1, 1995) and ISO 5006 (first edition dated Nov. 11, 2006). ISO 5353 defines how to measure and establish the position of the seat index point SIP, and ISO 5006 establishes standards regarding a work vehicle operator's field of view using the seat index point SIP as a reference point.

As defined by ISO 5353, the seat index point SIP of a work vehicle seat is determined by placing an SIP measuring device on the seat in a specified orientation. The SIP measuring device includes an SIP mark for identifying the seat index point SIP. If the seat has any fore, aft, vertical, and or angular adjustments, each of the adjustments is set to a center position within the range of adjustment before measuring the seat index point SIP. Once the seat and the SIP measuring device are properly arranged, weights (masses) are added to the SIP measuring device in a specified manner and at a specified position to approximate the weight of an operator weighing 75 kg. The position of the SIP mark is then located and measured with respect to a predetermined fixed point of the work vehicle. The fixed point can be any point of the seat that is fixed with respect to the vehicle body. For example, the fixed point can be a point corresponding to where a rigid base frame of the seat is bolted to a floor of the operator cab.

In this disclosure, the seat index point SIP is used as a reference point indicating a position of an operator seated in the driver's seat. The design eye point EP is defined to be a point located at a prescribed vertical height above the seat index point SIP. In this disclosure, the design eye point EP is defined to be 680 millimeters above the seat index point SIP. The design eye point EP is used as a reference point approximating the position of the operator's eyes when seated in the driver's seat. By establishing a positional and directional relationship between the seat index point SIP (or the design eye point EP) and the chamfered exterior surface 46a of the second body part 20, a particular structure of the vehicle body 16 and the work vehicle 10 as a whole is defined.

The design eye point EP as defined in this disclosure is slightly different from the filament position center point (FPCP) described in ISO 5006. As defined by ISO 5006, the filament position center point is located 20 centimeters farther forward than the seat index point SIP and, thus, is 20 centimeters forward of the design eye point EP as defined in this disclosure.

Many parts of the work vehicle are conventional components that are well known in the work vehicle field. Since these components are well known in the work vehicle field, these structures will not be discussed or illustrated in detail herein, except as related to the invention set forth in the following claims.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiment(s), the following directional terms "forward", "rearward", "above", "downward", "vertical", "horizontal", "below" and "transverse" as well as any other similar directional terms refer to those directions of a work vehicle on a level surface with the vehicle body arranged such that operator cab faces in a forward advancement direction of the work vehicle. Accordingly, these terms, as utilized to describe the present invention should be interpreted relative to a work vehicle equipped with the present invention.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A work vehicle comprising:
a ground propulsion apparatus;
a chassis supported by the ground propulsion apparatus; and
a vehicle body supported by the chassis, the vehicle body including a first body part with an operator cab disposed on a first lateral side of the chassis and a second body part disposed on a second lateral side of the chassis, the first and second lateral sides being opposite lateral sides with respect to a fore-aft longitudinal center line of the work vehicle,
the second body part having a front exterior surface facing in a forward direction of the work vehicle, an inner side exterior surface facing in a laterally inward direction of the work vehicle, and a vertically extending chamfered exterior surface slanted in an outward-forward direction from the inner side exterior surface towards the front exterior surface to define a vertically extending chamfered corner, the chamfered exterior surface being disposed at least in an area extending from a height position corresponding to a seat index point of the operator cab to a height position corresponding to a design eye point of the operator cab.

2. The work vehicle according to claim 1, wherein the chamfered exterior surface extends at least one-fourth of an overall widthwise dimension of the second body part.

3. The work vehicle according to claim 1, wherein the chamfered exterior surface is disposed with respect to the seat index point of the operator cab to provide at least fifty-five degrees of lateral visibility from a forward sight plane that passes through the seat index point.

4. The work vehicle according to claim 1, wherein the chamfered exterior surface extends downward from a top of the second body part to a bottom of the second body part.

5. The work vehicle according to claim 1, wherein the front exterior surface of the second body part includes a frontwardly bulged portion at least partially disposed below the seat index point of the operator cab, and the chamfered exterior surface extends at least partially along the frontwardly bulged portion.

6. The work vehicle according to claim 1, wherein the second body part houses at least one fluid tank disposed in a frontward portion of the second body part, and
the at least one fluid tank has a vertically extending chamfered corner that is nested inside the chamfered corner of the second body part.

7. The work vehicle according to claim 1, wherein the ground propulsion apparatus includes a first track located beneath the first body part and a second track located beneath the second body part.

8. The work vehicle according to claim 7, wherein the chamfered exterior surface is disposed with respect to the seat index point of the operator cab and the second track to provide a view of at least 760 millimeters of the second track in a longitudinal direction of the work vehicle from the design eye point.

9. The work vehicle according to claim 7, wherein a rearmost portion of the vehicle body is positioned forward with respect to a rearmost end of each of the first and second tracks.

10. The work vehicle according to claim 1, wherein the vehicle body is swingably mounted to the chassis about a vertical swing axis.

11. The work vehicle according to claim 10, further comprising a boom arranged between the first body part and the second body part.

12. The work vehicle according to claim 11, wherein the boom is attached to the vehicle body at a point rearward of the operator cab.

13. The work vehicle according to claim 1, wherein the vehicle body includes a deck supporting the first and second body parts, the deck has a front end edge extending in a widthwise direction of the chassis, the front end edge includes a first end edge portion that is disposed on the first lateral side and a second end edge portion that is disposed on the second lateral side, the first end edge portion being offset in a rearward direction of the chassis from the second end edge portion.

14. A work vehicle comprising:
a ground propulsion apparatus;
a chassis supported by the ground propulsion apparatus; and
a vehicle body supported by the chassis, the vehicle body including a deck, a first body part with an operator cab disposed on a first lateral side of the deck and a second body part disposed on a second lateral side of the deck, the first and second lateral sides being opposite lateral sides with respect to a fore-aft longitudinal center line of the work vehicle,
the deck having a front end edge extending in a widthwise direction of the chassis, the front end edge including a first end edge portion disposed on the first lateral side and a second end edge portion disposed on the second lateral side, the first end edge portion being offset in a rearward direction of the chassis from the second end edge portion, the front end edge of the deck includes a transitional portion extending diagonally between the first and second end edge portions, the first body part having a first lower frontward edge and the second body part having a second lower frontward edge, the first lower frontward edge being disposed rearward of the second lower frontward edge.

15. The work vehicle according to claim 14, wherein the first body part partially overhangs forwardly beyond the first end edge portion.

16. The work vehicle according to claim 14, wherein
the second body part has a front exterior surface facing in a forward direction of the work vehicle, an inner side exterior surface facing in a laterally inward direction of the work vehicle, and a vertically extending chamfered exterior surface slanted in an outward-forward direction from the inner side exterior surface towards the front exterior surface to define a vertically extending chamfered corner, and
the transitional portion substantially corresponds to a shape of the chamfered corner as viewed in a top plan view.

17. The work vehicle according to claim 14, wherein
the ground propulsion apparatus includes a first track located beneath the first body part and a second track located beneath the second body part, and a rearmost portion of the vehicle body is positioned forward with respect to a rearmost end of each of the first and second tracks.

18. The work vehicle according to claim 14, wherein
the vehicle body is swingably mounted to the chassis about a vertical swing axis.

19. The work vehicle according to claim 18, further comprising
a boom attached to the deck between the first body part and the second body part at a point rearward of the operator cab.

* * * * *

UNITED STATES PATENT AND TRADEMARK OFFICE
CERTIFICATE OF CORRECTION

PATENT NO. : 10,421,503 B2
APPLICATION NO. : 15/617282
DATED : September 24, 2019
INVENTOR(S) : Raymond E. DeJong et al.

It is certified that error appears in the above-identified patent and that said Letters Patent is hereby corrected as shown below:

On the Title Page

Change:
(73) Assignee: Daikin Industries, Ltd., Osaka (JP)
To:
-- (73) Assignee: KOMATSU LTD., Tokyo (JP) --

Signed and Sealed this
Fourth Day of October, 2022

Katherine Kelly Vidal
*Director of the United States Patent and Trademark Office*